UNITED STATES PATENT OFFICE.

WILLIAM HENRY PRESTWICH, OF LONDON, ENGLAND, ASSIGNOR TO THE EASTMAN KODAK COMPANY, OF ROCHESTER, NEW YORK.

SENSITIZED PHOTOGRAPHIC PAPER.

SPECIFICATION forming part of Letters Patent No. 525,512, dated September 4, 1894.

Application filed May 2, 1894. Serial No. 509,837. (No specimens.) Patented in England March 14, 1893, No. 5,517.

*To all whom it may concern:*

Be it known that I, WILLIAM HENRY PRESTWICH, of Tottenham, London, in the county of Middlesex, England, have invented certain new and useful Improvements in Sensitized Photographic Papers, (for which I have obtained British Letters Patent, dated March 14, 1893, No. 5,517;) and I do hereby declare the following to be a full, clear, and exact description of the same, such as will enable others skilled in the art to practice the invention.

My invention relates to sensitive silver emulsions for coating glass, films or paper for photographic purposes, my improved emulsion in the case of negatives preventing what is known as solarization and halation which characterize negatives, taken on plates coated with emulsion made in the ordinary way from gelatine only of subjects photographed in strong contrast; in the case of transparencies imparting a ground glass effect, and in the case of prints on paper or opal glass, producing a matte surface. These results I obtain by using in conjunction with gelatine a proportion of an amylaceous substance such as starch, arrowroot, corn or rice flour.

In carrying out my invention I prepare a solution in water of gelatine and starch or its analogues, this mixture or solution being used in the emulsification of the silver haloid in the usual manner. In practice I find that the desired matte surface is obtained by using three parts of gelatine to one part of the particular starch selected, but these proportions may be varied. To prevent precipitation of the starch it is advisable after softening the gelatine and starch in water, to raise the temperature to from 130° to 160° Fahrenheit, this boiling or cooking causing a certain amount of swelling of the starch granules and thus rendering them less liable to be precipitated, than before cooking in the gelatine solution, but care must be taken not to heat the mixture sufficiently to burst the starch granules.

As an example of a chloride emulsion for printing out or for development, I give the following, which I have found to give good results:—water, twenty ounces; starch, two hundred grains; gelatine, six hundred grains; citric acid, fifty grains; recrystallized carbonate of soda, fifty grains; chloride of barium, fifty grains; nitrate of silver, one hundred and fifty grains; alcohol, one ounce. The mixture of water, gelatine and starch to be raised to a temperature of 130° to 150° Fahrenheit and the chloride of barium and nitrate of silver to be added at a temperature of not more than 110° Fahrenheit. After filtering the emulsion is ready for use.

The following formula for a bromide of silver emulsion for development I have found gives very satisfactory results:—water, twenty ounces; Nelson's gelatine (No. 1 photographic), three hundred grains; hard gelatine, three hundred grains; starch, two hundred grains. The temperature of this mixture is raised to, say, 140° Fahrenheit, and then bromide of ammonium, two hundred grains; ammonia nitrate of silver, two hundred grains; nitrate of silver (dry), one hundred grains; alcohol, one ounce, are added, the bromide and silver at a temperature of 100° to 110° Fahrenheit. After filtering the emulsion is ready for coating.

Surfaces coated with the emulsion last described may be developed with any suitable developer, but I prefer to develop with a ferrous oxalate developer as follows:—No. 1—oxalate of potassium, twenty ounces; water, eighty ounces; bromide of ammonium, four hundred grains. No. 2—water, eighty ounces; protosulphate of iron, four ounces; citric acid, one-half ounce, equal proportions of No. 2 being added to No. 1 for use. After washing, the film may be hardened in a solution of alum having the proportions of one ounce of alum to sixteen ounces of water, and fixed in fresh hyposulphite of soda solution containing three ounces of hyposulphate to a pint of water. If the prints are not required to be mounted at once they are best blotted off by blotting paper, otherwise water drying marks are likely to form.

The above described emulsion is particularly adapted for use on paper for printing positives and it may be applied to the paper by the use of any of the well-known coating machines or by hand. The prints produced are fine grained and softer in tone and more nearly resemble platinotypes than do the ordinary silver bromide prints.

I claim as my invention—

1. As an article of manufacture, a paper coated with gelatino-argentic emulsion containing starch, substantially as described.

2. A haloid emulsion, for use in photography, containing a vehicle composed of gelatine and starch, substantially as and for the purpose specified.

WILLIAM HENRY PRESTWICH.

Witnesses:
F. E. WESTON,
J. A. MCNICOL.